Jan. 9, 1951      J. A. DANIELSON      2,537,212

SELF-CLOSING NONRELEASING FLUID-ACTUATED VALVE

Filed March 29, 1948

INVENTOR.
JOHN A. DANIELSON
BY
Munn, Liddy & Glaccum
ATTORNEYS.

Patented Jan. 9, 1951

2,537,212

UNITED STATES PATENT OFFICE 2,537,212

SELF-CLOSING NONRELEASING FLUID-ACTUATED VALVE

John A. Danielson, Richmond, Calif.

Application March 29, 1948, Serial No. 17,656

3 Claims. (Cl. 251—118)

The present invention relates to improvements in a self-closing, non-releasing, fluid-actuated valve. It consists of the combinations, constructions and arrangements of parts, as hereinafter described and claimed.

An object of my invention is to provide a self-closing, non-releasing, fluid-actuated valve which is especially designed for use in the air brake systems of vehicles. In my copending application on a two-way automatic check valve and signal, Serial No. 625,845, filed October 31, 1945, I disclose a valve especially designed to shut off automatically the air flowing through a compressed air hose when the hose breaks or becomes disconnected from a pneumatic tool. The hose is prevented from whipping and doing damage to property and people. A bleed passage in the valve feeds a small quantity of air into the hose so that a fixing of the break in the hose or the attachment of the hose to the air tool, would permit air pressure to be built up in the line quickly, whereupon the valve would open automatically.

In using a valve on the air brake systems of vehicles, a different set of problems were presented. It was necessary to design a valve whose operation was not affected by the swinging, swaying or jolting of the vehicle as it moved over the ground or turned sharp curves at relatively high speeds. Furthermore, the valve must be designed to close and stay closed when once the line in which it was mounted, broke or became disconnected.

The principal object of my invention is therefore to provide a valve that will close automatically when the line in which it forms a part, breaks or becomes disconnected, and remains closed, novel means being provided to prevent any movement of the vehicle, which carries the valve, from causing the valve to close accidentally. The valve permits a sudden flow of air to pass therethrough when the operator applies the brakes, but as soon as the air line leading to a brake mechanism breaks or becomes disconnected, the valve will instantly close and remain closed. The valve needs to be reset before it can again be used.

A further object of my invention is to provide a device of the type described which will permanently shut off the air to a broken air line and each time the air brakes are used thereafter, will sound a warning signal, indicating to the driver that one of the brakes is not operating.

Other objects and advantages will appear in the following specification, and the novel features of the device will be particularly pointed out in the appended claims.

My invention is illustrated in the accompanying drawing forming a part of this application, in which.

Figure 1:
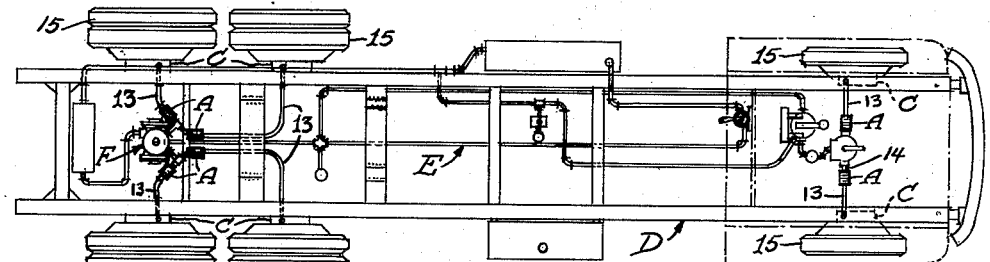
Figure 1 is a schematic plan view of an air brake system for a vehicle and indicates where my automatic closing valves would be placed in the system.

While I have shown only the preferred form of my invention, it should be understood that various changes or modifications may be made within the scope of the appended claims without departing from the spirit and scope of the invention.

In carrying out my invention I provide a valve casing indicated generally at A and preferably made as a single casting. The casing has an inlet opening 1 for fluid, extending inwardly from the end 2 of the casing and communicating with a compartment 3. The upper portion of the compartment extends above the inlet opening and the compartment is also provided with a pit or recess that is made semispherical in shape so as to receive a ball valve B. A second compartment 5 is provided in the casing and is separated from the first compartment by an opening 6 that is only large enough to permit the ball valve B to pass therethrough. It will be noted from Figure 2 that the top of the opening 6 indicated at 6a is disposed at a lower level than the tops 3a and 5a of the compartments 3 and 5, respectively.

Figure 4:
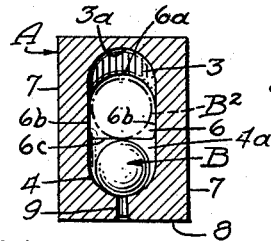
Figure 4 is a transverse section taken along the line IV—IV of Figure 2.
Figure 5:
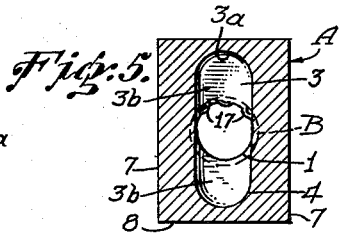
Figure 5 is a transverse section taken along the line V—V of Figure 7.
Figure 6:
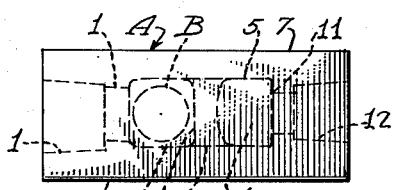
Figure 6 is a top plan view of Figure 2.
Figure 7:
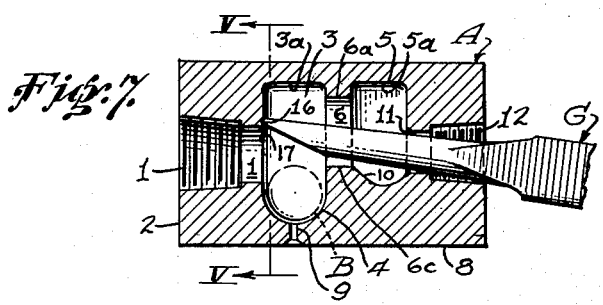
Figure 7 is a view similar to Figure 2 and illustrates how the ball valve is permanently retained in the casing.

Figure 4 illustrates how the top 6a of the opening 6 is rounded so as to conform to the curvature of the ball valve B. The side walls 6b of the opening are tangent to the ends of the curved top 6a and parallel the sides 7 of the casing. The bottom of the opening 6 is indicated at 6c and this bottom surface parallels the lower wall 8 of the casing. I term the opening 6 a "needle eye" because the "eye" is slightly larger than the diameter of the ball B and the arrangement is such that the ball is prevented from accidentally moving through the "eye" when the casing is moved suddenly due to the swinging, swaying or jolting movement of the vehicle as it travels over the ground.

Figure 2:
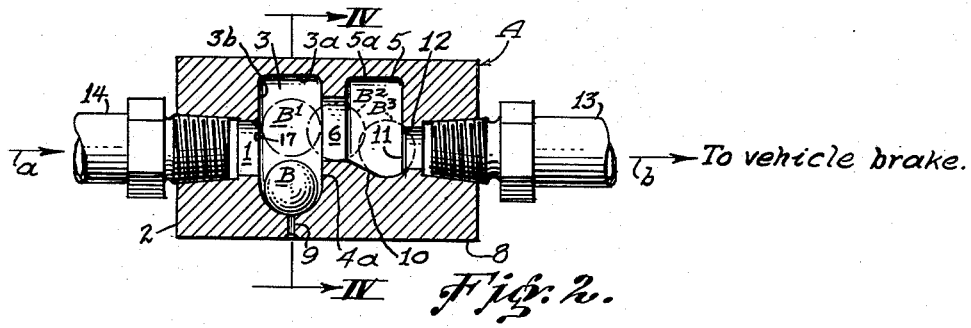
Figure 2 is a longitudinal section taken along the line II—II of Figure 3.
Figure 3:
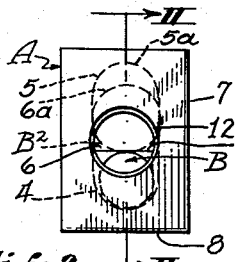
Figure 3 is a right hand end view of Figure 2.

Reference again to Figure 4 when taken in conjunction with Figure 2 shows the compartment 3 provided with a wall 4a that extends upwardly from the pit 4 and this wall has its surface extending at right angles to the axis of the opening or "eye" 6. The lower edge 6c of the opening is spaced at least as high as the top of the ball valve B when the latter rests in the pit. The wall 4a will therefore act as a dam or obstruction and will prevent the ball from moving into the compartment 5 when the vehicle makes a sharp turn at a relatively high speed and the centrifugal force tends to move the ball valve to the right in Figure 2. It will require a sudden flow of air of sufficient volume and for a long enough time to lift the ball valve from the pit and project it through the opening or "eye" before the ball will move into the compartment 5.

The normal position of the ball is shown in full lines in Figure 2 where it is received in the pit 4 and covers an outlet bore 9 that is used to give a warning signal when the ball uncovers the bore and air issues therethrough during the application of the air brakes to the vehicle. The dash line B1 in Figure 2 shows the initial movement of the ball valve caused by the flow of air through the valve when the air line to the brake is broken and the operator applies the brakes to the vehicle. The dot dash line B2 indicates the movement of the ball through the opening or "eye" while the smaller dash line B3 in the same figure illustrates the position of the ball when it closes the valve.

I have discovered in experimenting with the valve in my co-pending application S. N. 625,845, previously mentioned, that upon sudden reduction of pressure due to a break, the ball's path to its seat is dependent upon the length of hose between the safety valve and the break. For instance, with a short hose, that is, when the break is substantially at the exit of the valve, the ball's path to its seat is a vertical path from its normal position until caught in the air-steam and then directly to its seat. Whenever a long piece of hose (such as 200 or 300 feet) is between the safety valve and the break the ball's path assumes a flat arc. The explanation of this, I believe, is that under normal circumstances the ball is entirely surrounded by air under high pressure. After a break occurs the pressure surrounding the upper portion of the ball is quickly reduced relative to that on the lower half, therefore, the high pressure air surrounding the lower half of the ball lifts the ball into the low pressure area above the ball to a height depending upon the relative change in pressure. In a system as herein proposed the ruptures in the air brake system compare to a rupture substantially at the valve exit. Consequently the phenomenon of the right angular path is utilized.

The compartment 5 has an inclined lower surface 10 which will convey the ball valve to a valve seat 11 that is placed at the juncture of an outlet opening 12 with the compartment 5. The inclined surface 10 keeps the ball seated when the ball once moves into the compartment 5 and therefore the valve will remain permanently closed until it is manually reseated. The outlet opening 12 has an air hose 13 communicating therewith and this air hose leads to a vehicle brake indicated generally at C in Figure 1. A bus D is indicated in this Figure and has an air brake system E. The system has a relay or quick release valve indicated generally at F from which air lines 14 pass to the brake mechanisms C for the wheels 15. The valve A is connected to each air line 14 and to a second air line 13 that extends from the valve outlet 12 to the vehicle brake. Two of the valves for two of the rear wheels extend in a longitudinal direction with respect to the bus chassis while the other two for the other two rear wheels make angles of forty-five degrees with respect to the longitudinal axis of the bus. Additional valves A are placed in the air lines leading to the brakes for the front bus wheels. The valves that extend transversely to the longitudinal axis of the bus or extend at an angle thereto are the ones that are subjected to various kinds of motions including centrifugal force which tend to cause the ball valve in each casing to move from the compartment 3 to the compartment 5. The dam or obstruction 4a in each valve casing prevents this.

Before describing the operation of the valve, it is best to state that the inlet opening 1 is large enough at its smallest diameter to permit the ball valve B to pass therethrough. The outlet opening 11 is too small for the ball to pass therethrough. After the ball is received in the compartment 3, an upsetting tool G is inserted through the outlet end 12 and is used so that its cutting edge 16 will form indentations or projections 17 in the wall to restrict the diameter of the opening 1 and prevent the ball valve from again passing out through the opening. Two or three blows are struck by the tool to form the projections and then the tool may be withdrawn and the pipes 13 and 14 connected to the outlet 12 and the inlet 1, respectively. Both the outlet and inlet are tapped for this purpose.

From the foregoing description of the various parts of the device, the operation thereof may be readily understood.

I do not wish to be confined to any particular position of mounting the valves in the air lines. The valves are mounted as close to the quick release valve F as possible and act to close the lines 13 should any one of them break or become disconnected from the brake mechanism C. It is to be understood that only the valve connected to the broken air line will close while all of the other valves will remain open and this will permit the driver to use all of the brakes with the exception of the one that has its air line disconnected.

In normal use, the application of the brake pedal by the driver will cause air to flow through the pipes 14 and 13 in the manner shown by the small arrows a and b in Figure 2. The pit 4 is deep enough and the wall 4a offers sufficient obstruction to prevent the ball valve from moving into the compartment 5 and closing the seat 11 during the normal operation of the air brakes. Moreover, the positioning of the opening or "eye" 6 in the wall 4a prevents any accidental moving of the ball from the compartment 3 into the compartment 5 due to any swaying or jolting action of the bus caused by its movement over the surface. The wall 4a will prevent the ball valve from moving into the compartment 5 due to any centrifugal force exerted on the ball valve by the sudden turning of the vehicle. In other words the compartment 3 will retain the ball valve therein regardless of the motion imparted to the valve casing by the movements of the vehicle, until the ball is actually lifted by an increased flow of air and moved through the opening 6 by the air stream flowing into the compartment 5. The increased air flow is caused by the breaking of the air line 13 or its disconnection from the brake mechanism C and the application of the brakes by the driver which will cause air to flow from the pipe 14 through both compartments.

The movement of the ball from the compartment 3 to the compartment 5 is indicated at B1, B2 and B3 in Figure 2. A blast of air is necessary to "thread" the ball through the "needle eye" 6. When the ball once enters the compartment 5 it will not return to the compartment 3, but will remain seated against the valve seat 11 even though the brakes are not applied and air ceases to flow from the line 14. The inclined surface 10 maintains the ball against the seat. Any flow of air through the valve casing due to the application of the brakes by the driver will be prevented from passing through the outlet 12 because this outlet will be closed by the ball valve. Some of the air will pass through the bore 9 and will issue from the valve casing with sufficient noise to constitute a warning signal. Any type of air signal may be used if desired and will receive the air from the passage 9. It should be noted that the signal would only be sounded when the air brake is applied and when the ball valve is in the compartment 5. The driver will therefore be warned when any one of the wheel brakes is not working.

Before the valve can again function, the line 13 must be fixed and the ball valve B moved from the compartment 5 back into the compartment 3. When this is accomplished the ball valve will not interfere with the normal functioning of the air brake. At the same time the passage 9 will be closed by the ball and no warning sound will be made during the application of the brakes.

As long as the air line 13 is intact between the valve A and the brake chamber C, the air pressure cannot lift the ball B into closing position when the operator applies the brakes because the air pressure in the line builds up practically instantly and prevents sufficient air flow to lift the ball.

I claim:

1. A valve comprising a casing having a compartment with a pit for receiving a ball, a ball normally received in the pit, said casing having a second compartment and an opening interconnecting the two compartments, the opening being large enough for the ball to pass therethrough and communicating with the first mentioned compartment at a point above the pit, said casing having an air inlet passage communicating with the first compartment at a point where the air will be guided across the top of the ball while the latter rests in the pit, and having an air outlet passage communicating with the second compartment adjacent to the bottom thereof, the outlet opening being smaller in diameter than that of the ball, whereby the ball will close the outlet when the ball is received in the second compartment, the bottom of said second compartment extending below said interconnecting opening whereby the ball will be retained in the second compartment to permanently close the valve until manually returned to the first compartment.

2. A valve comprising a casing having a compartment with a pit for receiving a ball, a ball normally received in the pit, said casing having a second compartment and an opening interconnecting the two compartments, the opening being large enough for the ball to pass therethrough and communicating with the first mentioned compartment at a point above the pit, said casing having an air inlet passage communicating with the first compartment at a point where the air will be guided across the top of the ball while the latter rests in the pit, and having an air outlet passage communicating with the second compartment adjacent to the bottom thereof, the outlet opening being smaller in diameter than that of the ball, whereby the ball will close the outlet when the ball is received in the second compartment, the bottom of said second compartment being inclined downwardly from said interconnecting opening whereby the ball will be kept seated in the outlet opening until manually returned to the first compartment.

3. A valve comprising a casing having a compartment with a pit for receiving a ball, a ball normally received in the pit, said casing having a second compartment and an opening interconnecting the two compartments, the opening being large enough for the ball to pass therethrough and communicating with the first mentioned compartment at a point above the pit, said casing having an air inlet passage communicating with the first compartment at a point where the air will be guided across the top of the ball while the latter rests in the pit, and having an air outlet passage communicating with the second compartment adjacent to the bottom thereof, the outlet opening being smaller in diameter than that of the ball, whereby the ball will close the outlet when the ball is received in the second compartment, the bottom of said second compartment being inclined downwardly from said interconnecting opening whereby the ball will be kept seated in the outlet opening until manually returned to the first compartment, and means for producing an audible signal when said valve is closed.

JOHN A. DANIELSON.

REFERENCES CITED

The following references are of record in the file of this patent:

UNITED STATES PATENTS

| Number | Name | Date |
|---|---|---|
| 10,537 | Bassett | Feb. 14, 1854 |
| 248,902 | Whitman | Nov. 24, 1925 |
| 756,282 | Rankin | Apr. 5, 1904 |
| 871,717 | Lyter | Nov. 19, 1907 |
| 1,518,461 | Smith | Dec. 9, 1924 |
| 1,563,143 | Bailie | Nov. 24, 1925 |
| 2,254,990 | Blank | Sept. 2, 1941 |

FOREIGN PATENTS

| Number | Country | Date |
|---|---|---|
| 146,478 | Germany | Dec. 2, 1903 |
| 409,169 | Great Britain | of 1933 |